(12) United States Patent
Bourgault et al.

(10) Patent No.: US 7,412,933 B2
(45) Date of Patent: Aug. 19, 2008

(54) SEEDER WITH TRAILING ARM AND HOE-TYPE MID ROW BANDER

(75) Inventors: Gerard Bourgault, St. Brieux (CA); Mark Cresswell, St. Brieux (CA)

(73) Assignee: Bourgault Industries, Inc., St. Briex, Sashkatchewan (CA)

( * ) Notice: Subject to any disclaimer, the term of this patent is extended or adjusted under 35 U.S.C. 154(b) by 205 days.

(21) Appl. No.: 11/406,859

(22) Filed: Apr. 19, 2006

(65) Prior Publication Data
US 2007/0245938 A1    Oct. 25, 2007

(51) Int. Cl.
A01C 5/00 (2006.01)
A01C 7/00 (2006.01)
A01C 9/00 (2006.01)
A01C 13/00 (2006.01)

(52) U.S. Cl. ......................... 111/156; 111/170; 111/195

(58) Field of Classification Search .................. 111/120, 111/121, 123–125, 129, 149, 157, 163–170, 111/190–196, 156
See application file for complete search history.

(56) References Cited

U.S. PATENT DOCUMENTS

| 5,331,907 | A | 7/1994 | Beaujot |
| 5,396,851 | A | 3/1995 | Beaujot |
| 6,142,085 | A | 11/2000 | Drever et al. |
| 6,216,616 | B1 | 4/2001 | Bourgault |
| 6,457,426 | B1 | 10/2002 | Cruson |
| 6,640,731 | B1 | 11/2003 | Rowlatt et al. |

*Primary Examiner*—Christopher J. Novosad
(74) *Attorney, Agent, or Firm*—Frost Brown Todd LLC (57) ABSTRACT

A seeding and fertilizing apparatus comprises a plurality of seed assemblies each comprising a trailing arm pivotally connected at a front end thereof to the frame and a packer wheel rotatably attached to rear end thereof. A seed furrow opener is attached to the trailing arm ahead of the packer wheel which rolls along the seed furrow created by the opener. A vertical position of the seed furrow opener with respect to the packer wheel is adjustable, and a bias device is operative to exert a downward bias force on the trailing arm. A plurality of fertilizer assemblies each comprises a fertilizer knife mounted to the frame such that a vertical position of the fertilizer knife with respect to the implement frame is adjustable. The seed assemblies and fertilizer assemblies are oriented laterally such that each fertilizer furrow is located between adjacent seed furrows.

29 Claims, 9 Drawing Sheets

SEEDER WITH TRAILING ARM AND HOE-TYPE MID ROW BANDER

This invention relates to agricultural implements and more specifically to a seeding apparatus for one pass seeding and fertilizing.

BACKGROUND OF THE INVENTION

Air seeders typically comprise two or more product tanks, for carrying granular agricultural products such as seed and fertilizer, mounted on a wheeled frame assembly. A fan creates an air stream to distribute the agricultural products to furrow openers and into the soil. Modern air seeders are known that simultaneously place seed and fertilizer in the soil of a field without tillage such that a field can be seeded and fertilized in a single pass.

It is generally accepted certain types of fertilizer can be mixed with seed and placed in the same furrow, but for the higher rates and fertilizer types commonly used, it is required to provide some separation between the seed and fertilizer. Fertilizer that is placed too near the seed can damage the seed and reduce crop yield and quality, particularly with more sensitive seeds, in particular soil types and in dry soil conditions.

Common air seeder equipment is designed to place the seed and the fertilizer in different locations within essentially the same furrow, or in separate furrows that are not much more than one inch apart. A furrow opener apparatus can be mounted on the bottom end of a single shank to deliver seed and fertilizer into separate furrows, as is disclosed for example in U.S. Pat. No. 6,640,731 to Rowlett et al., and U.S. Pat. No. 6,457,426 to Cruson. Alternatively, a fertilizer furrow opener can be mounted on the bottom of one shank, with a seed furrow opener mounted at the bottom of a separate shank that is operated in close lateral proximity as disclosed for example in U.S. Pat. Nos. 5,396,851 and 5,331,907 to Beaujot, and U.S. Pat. No. 6,142,085 to Drever et al. The seeders of Beaujot and Drever include a trailing arm with separate shanks for the seed and fertilizer furrow openers extending down from the arm. A wheel on the rear end of the trailing arm packs the furrow and controls the depth of the fertilizer and seed furrow openers.

A problem with these types of systems is that in certain soil & moisture conditions, for example drier clay soils that tend to lump, it is very difficult to achieve separation of seed and fertilizer when the seed and fertilizer rows are in such close proximity. Often, some of the seed falls into the fertilizer furrow where same can be damaged. To avoid this problem, air seeders have been developed that place the fertilizer furrow about midway between the seed furrows, instead of closely adjacent to each seed furrow. An entirely separate furrow opener assembly including a shank, trip mechanism etc. is used for each seed furrow opener and for each fertilizer furrow opener. The furrow opener assemblies are spaced laterally along the frame at a desired spacing, and seed and fertilizer are directed into appropriate ones of the furrow opener assemblies to achieve the desired spacing and orientation of the seed and fertilizer in the soil.

Such an air seeder is disclosed for example in U.S. Pat. No. 6,216,616 to Bourgault. The Bourgault apparatus uses coulter disc type fertilizer furrow opener assemblies that create furrows mid way between adjacent pairs of furrows opened by coulter disc type seed furrow opener assemblies. The disclosed apparatus uses the same type of furrow opener assemblies for depositing both seed and fertilizer and does not allow independent adjustment of the seed placement openers nor does it allow independent depth control of each seed assembly during operation.

SUMMARY OF THE INVENTION

It is an object of the present invention to provide a seeding and fertilizing apparatus that overcomes problems in the prior art.

In a first embodiment the invention provides a seeding and fertilizing apparatus comprising an implement frame mounted on wheels for travel over the ground in an operating travel direction. A plurality of seed assemblies are attached to the implement frame, each seed assembly comprising a trailing arm pivotally connected at a front end thereof to the frame about a substantially horizontal front arm axis oriented substantially perpendicular to the operating travel direction, a seed furrow opener attached to the trailing arm and operative to create a seed furrow when a bottom end thereof is engaged in the ground, a packer wheel rotatably attached to the trailing arm rearward of the seed furrow opener and oriented to roll substantially along the seed furrow wherein a vertical operating position of the seed furrow opener with respect to the packer wheel is adjustable to vary a depth of the seed furrow, and a bias device operative to exert a downward bias force on the trailing arm, seed furrow opener, and packer wheel. A plurality of fertilizer assemblies each comprises a fertilizer knife mounted to the fertilizer assembly and operative to create a fertilizer furrow when engaged in the ground. The fertilizer knives and seed furrow openers are movable from a transport position above the ground to a lowered operating position wherein the fertilizer knives and seed furrow openers are engaged in the ground, and the seed assemblies and fertilizer assemblies are oriented laterally on the implement frame such that in operation each fertilizer furrow is located between adjacent seed furrows.

In a second embodiment the invention provides a method of seeding and fertilizing a field comprising providing an implement frame mounted on wheels for travel over the ground in an operating travel direction; attaching a plurality of seed assemblies to the implement frame, each seed assembly comprising a trailing arm pivotally connected at a front end thereof to the frame about a substantially horizontal front arm axis oriented substantially perpendicular to the operating travel direction, a packer wheel rotatably attached to rear end of the trailing arm, a seed furrow opener attached to the trailing arm ahead of the packer wheel and operative to create a seed furrow when a bottom end thereof is engaged in the ground, the seed furrow opener oriented such that the packer wheel rolls substantially along the seed furrow, and a bias device operative to exert a downward bias force on the trailing arm when the trailing arm is in the operating position; adjusting a vertical position of the seed furrow opener to a desired position with respect to the packer wheel; mounting a plurality of fertilizer assemblies to the frame, each fertilizer assembly comprising a fertilizer knife operative to create a fertilizer furrow when engaged in the ground; orienting the seed assemblies and fertilizer assemblies laterally on the implement frame such that in operation each fertilizer furrow is located between adjacent seed furrows; moving the seed furrow openers and fertilizer knives down from a transport position above the ground to a lowered operating position wherein the fertilizer knives and seed furrow openers are engaged in the ground; moving the implement frame across the field in the operating travel direction and depositing fertilizer into the fertilizer furrows and depositing seed into the seed furrows ahead of the packer wheel.

According to the present invention there are provided a number of fertilizer placement openers and a plurality of trailing arm seed placement openers that attach to a frame of a planting apparatus. The planting apparatus can be used in one pass seeding to place both seed and fertilizer in a field in a single pass. The seed placement openers are positioned so that furrows created by the seed placement openers are parallel at substantially regular intervals. The fertilizer placement openers are positioned on the frame such that furrows created by the fertilizer placement openers are positioned about mid-way between adjacent pairs of seed furrows created by the seed placement openers.

Fertilizer placement openers are adjustably connected to the frame of the planting apparatus and comprise a knife to create a furrow in a ground surface the planting apparatus is traveling across. Fertilizer is provided by the planting apparatus to a fertilizer feed located just behind the knife to dispense fertilizer into the furrow opened by the knife. The fertilizer is typically, supplied from holding tanks on the planting apparatus to the fertilizer feed through the use of tubes or conduits and can be a liquid type of fertilizer or a granular type of fertilizer.

Seed placement openers are adjustably connected to the frame of the packer apparatus and comprise a trailing arm with a seed dispensing furrow opener mounted thereon that creates a furrow in a ground surface the planting apparatus is traveling across, and a packer wheel mounted on the rear end of the trailing arm. Through the adjustment of the height of packer wheel in relation to the seed furrow opener, the depth the seed furrow opener penetrates the ground surface can be adjusted. Because the packer wheel sets the depth the seed furrow opener penetrates the ground surface, this depth of penetration is largely independent from the vertical height of the frame of the planting apparatus and variations in the vertical height of the frame when the planting apparatus is moving over an uneven ground surface. The depth of seed placement in each row remains consistent where the packer wheel which controls the operating depth of the seed furrow opener is located in close proximity to the seed furrow opener.

Seed is typically provided from a holding tank on the planting apparatus through a tube or conduit to the seed furrow opener to be placed in the furrow created by the seed furrow opener.

The invention allows for the individual adjustment of the depth of each furrow created by either a fertilizer placement opener or a seed placement opener, allowing an operator of the planting apparatus to tailor a one pass seeding and initial fertilizing of a field to the conditions of the field, and type of crop that will be seeded.

A parallel linkage trailing arm can conveniently provide improved consistency of seed furrow depth.

DESCRIPTION OF THE DRAWINGS

While the invention is claimed in the concluding portions hereof, preferred embodiments are provided in the accompanying detailed description which may be best understood in conjunction with the accompanying diagrams where like parts in each of the several diagrams are labeled with like numbers, and where:

DETAILED DESCRIPTION OF THE ILLUSTRATED EMBODIMENTS

Figure 1:
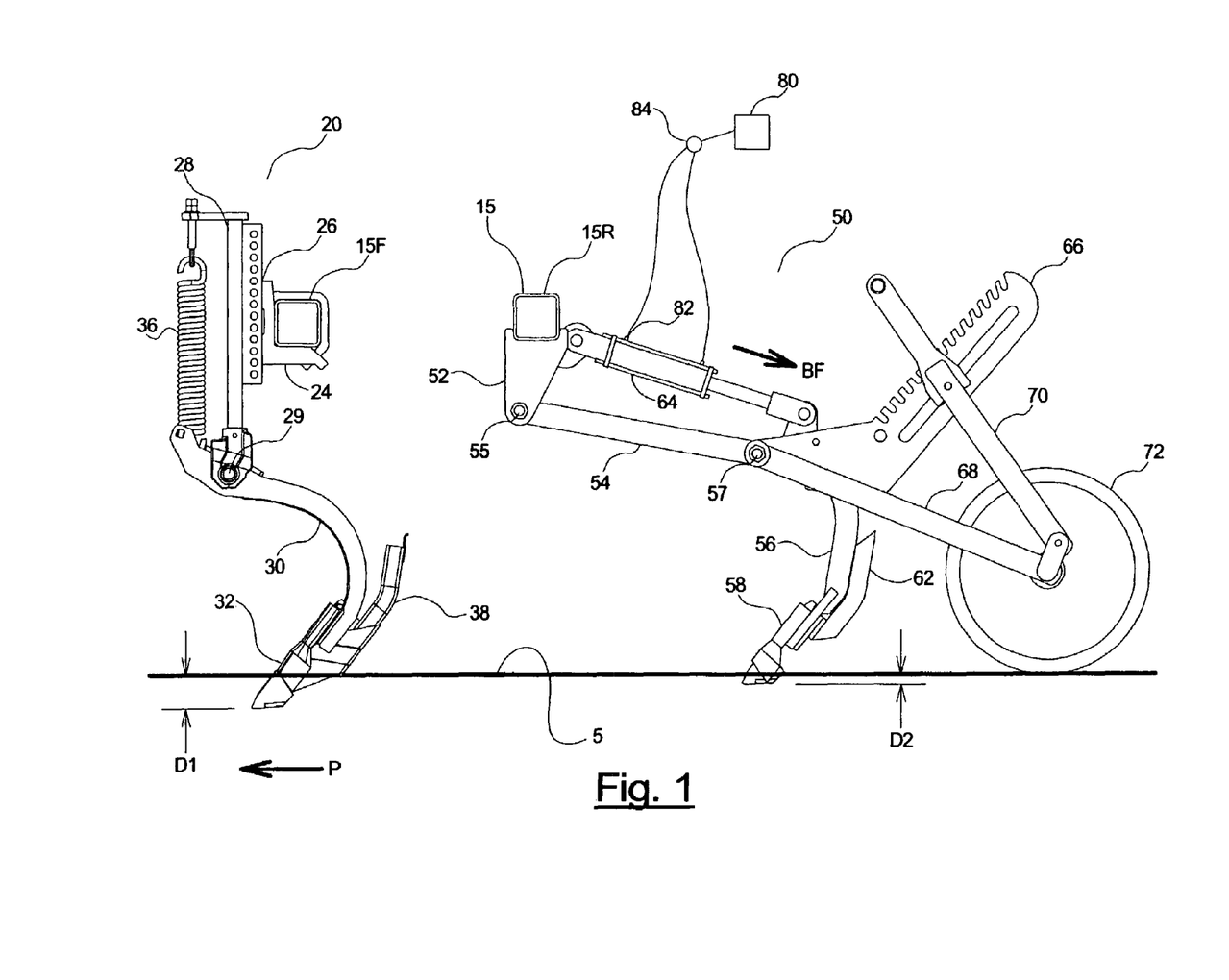
FIG. 1 is a schematic side view of an embodiment of the present invention showing a fertilizer assembly and a seed assembly attached to a frame.
Figure 2:
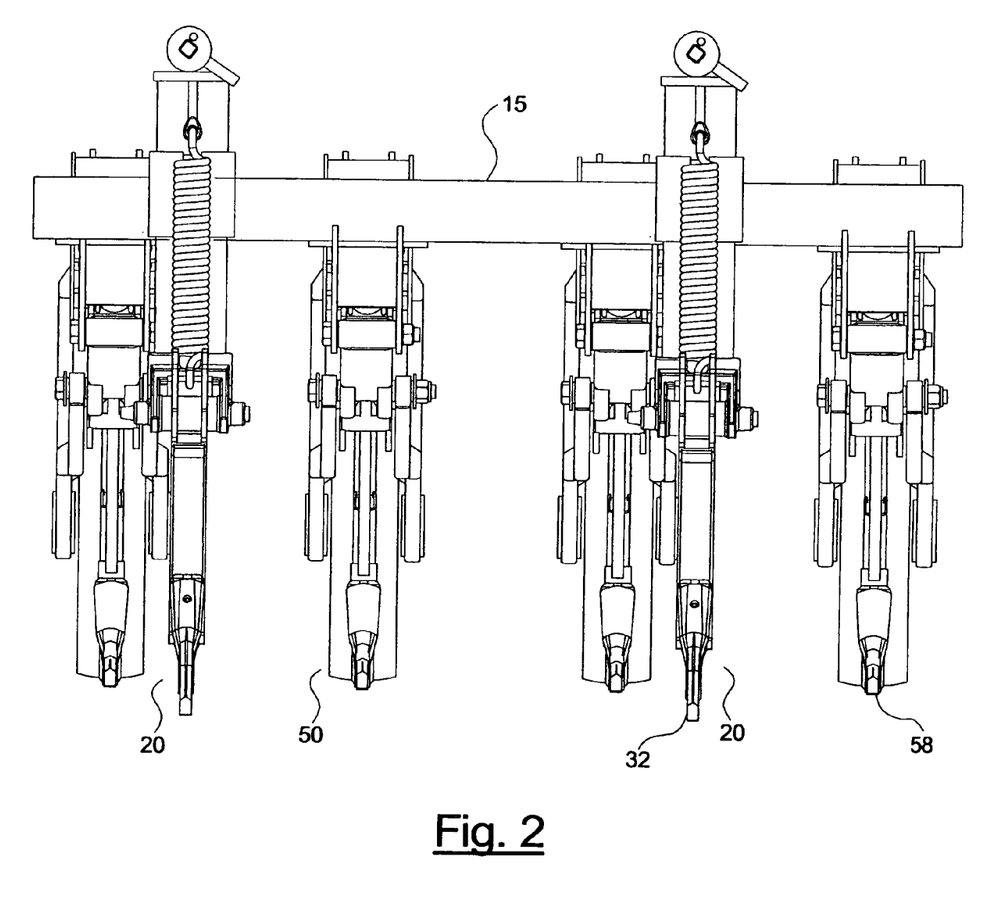
FIG. 2 is a front view of a number of the fertilizer assemblies and seed assemblies as shown in FIG. 1, attached to a section of a frame of a planting apparatus.
Figure 3:
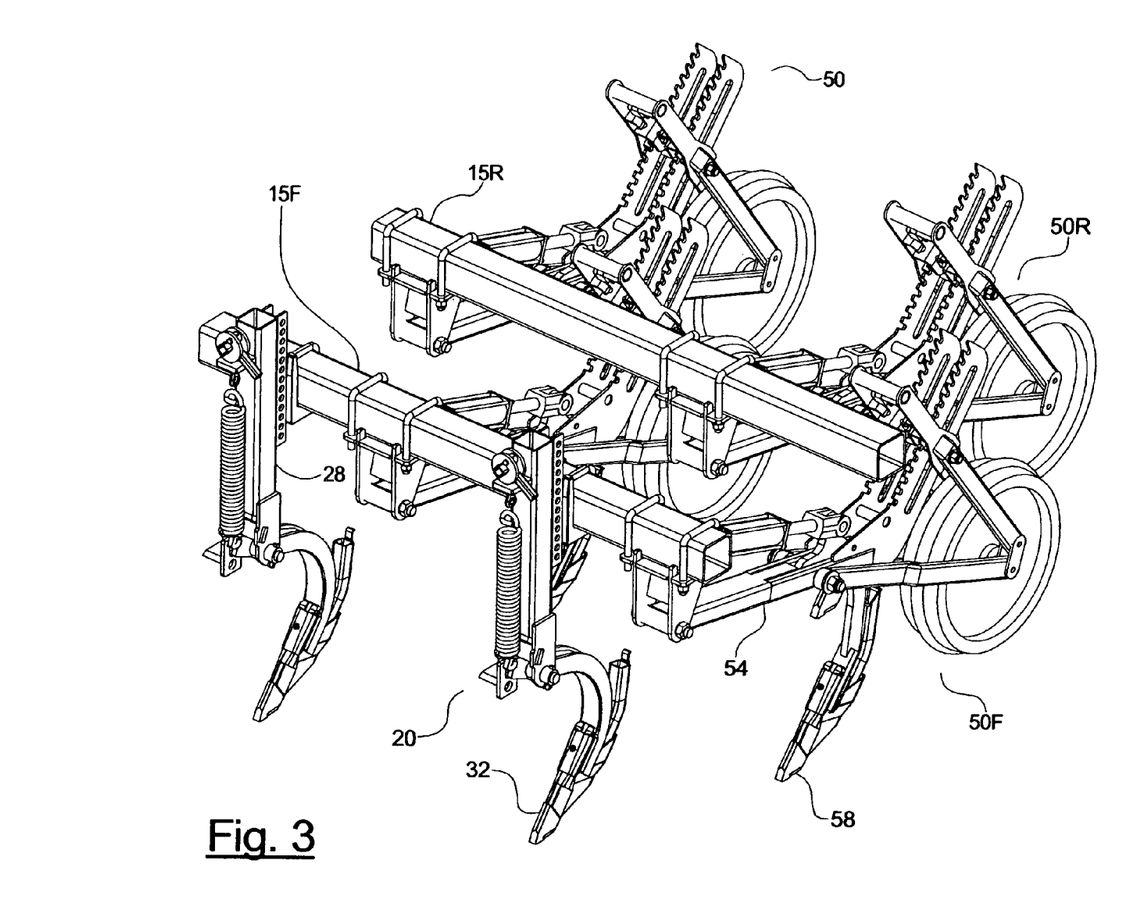
FIG. 3 is a perspective view of the fertilizer and seed assemblies as shown in FIG. 2.

FIG. 1 illustrates a side view of a fertilizer assembly 20 and a seed assembly 50, used in conjunction to seed and fertilize a field in one pass. FIGS. 2 and 3 illustrate a number of fertilizing assemblies 20 and seed assemblies 50 attached to a section of a frame 15 of a planting implement apparatus. The frame 15 is mounted to wheels for travel along the ground in an operating travel direction P.

Referring to FIGS. 1 and 2, fertilizer assembly 20 comprises a mounting bracket 24 attached to the frame 15. The mounting bracket 24 is connected to an elongate member 28 through a height adjustable connection 26. A fertilizer knife shank 30 is pivotally connected to the lower end of the elongate member 28 with a shank pin 29, and a fertilizer hoe or knife 32 is mounted to the knife shank 30. The fertilizer knife 32 creates a fertilizer furrow in a ground surface 5 when the fertilizer placement opener 20 is moving in a direction of travel P. A fertilizer feed 38 is mounted behind fertilizer knife 32. The fertilizer feed 38 receives fertilizer from a supply via a conduit or hose (not shown) and dispenses it into the fertilizer furrow opened by the fertilizer knife 32.

The illustrated height adjustable connection 26 comprises a series of apertures in the elongate member 28 such that same can be moved vertically in relation to the mounting bracket 24 and fixed in place by inserting an adjustment bolt or pin into one of the apertures to fix the elongate member 28 in place in relation to the mounting bracket 24. By using the height adjustable connection 26, a depth D1 the fertilizer knife 32 penetrates the ground surface 5 can be either increased or decreased. The depth D1 can also be varied by raising or lowering wheels supporting the frame 15, such that the frame and fertilizer knife 32 move up or down with respect to the ground surface 5. The fertilizer knife 32 is biased to the illustrated operating position by a knife biasing device 36 which is typically, but not necessarily an extension spring. An alternate embodiment described below for example uses a hydraulic cylinder biasing device.

The seed assembly 50 comprises a mounting bracket 52 attached to the frame 15. A front end of an elongate bracing member, trailing arm 54, is pivotally attached to the frame 15 by the mounting bracket 52 using an arm pin 55 such that the trailing arm 54 can pivot about an arm axis oriented substantially horizontally and perpendicular to the operating travel direction P. The rear end of the trailing arm 54 is attached to a downward extending seed shank 56. In the illustrated embodiment the seed shank 56 is pivotally attached to the trailing arm 54 by bolt 57, but in other designs the trailing arm and shank 56 could be formed from a single piece. A seed furrow opener, illustrated as seed knife 58, is bolted to the bottom end of the shank 56 and the bottom end of the seed knife 58 is configured to make a seed furrow in the ground surface 5. A seed dispensing tube 62 is mounted on the rear of the seed knife 58 and is operative to receive seed from a supply via a conduit (not shown) and dispense the seed in the seed furrow.

Rigidly attached to the rear end of the elongate trailing arm 54 is a packer adjustment bracket 66. A front end of a packer wheel arm 68 is pivotally attached to the rear end of the elongate trailing arm 54 with bolt 57. A packer wheel 72 is rotatably attached to the rear end of the packer wheel arm 68.

A packer adjustment brace 70 allows the packer wheel 72 to be adjusted substantially vertically in relation to the seed dispensing knife 58 to adjust a depth D2 the seed dispensing knife 58 penetrates the ground surface 5. A bottom end of the packer adjustment brace 70 is pivotally connected to the rear end of the packer wheel arm 68. The top end of the packer adjustment brace 70 is engaged in the packer adjustment bracket 66 and can be locked at a desired location in the bracket 66 to fix the vertical location of the knife 58 with respect to the packer wheel 72. Moving the packer wheel 72 height upwards relative to the seed knife 58 causes the seed knife 58 to penetrate further into the ground surface 5 and increase the depth D2. Moving the packer wheel 72 downward in relation to the seed knife 58 causes the seed knife 58 to penetrate shallower into the ground surface 5 and decrease depth D2.

The trailing arm 54, the seed knife 58, and the packer wheel 72 are biased against the ground surface 5 by a knife biasing device, illustrated as hydraulic cylinder 64. The hydraulic cylinder 64 is attached to the top end of the seed shank 56.

The hydraulic cylinder 64 is connectable to an active hydraulic source 80. When connected to a first port 82 of the hydraulic cylinder 64, the active hydraulic source 80 is operative to maintain a substantially constant pressure in the hydraulic cylinder 64 to exert a substantially constant downward bias force BF forcing the seed shank 56 against a stop on the on the trailing arm 54, and thus forcing the trailing arm 54, the seed knife 58, and the packer wheel 72 downward toward the ground during operation while allowing the hydraulic cylinder 64 to extend and retract in response to forces exerted on the seed knife 58 and the packer wheel 72. The active hydraulic source 80 allows the hydraulic cylinder 64 to act essentially the same as a spring, but providing a more constant bias force BF.

The illustrated embodiment also includes a valve 84 such that the active hydraulic source 80 can be connected to a second port on the hydraulic cylinder 64 to raise the trailing arm 54, seed knife 58, and the packer wheel 72 to a transport position to increase clearance between the knives 58 and packer wheels 72 and the ground.

The knife biasing device could also be provided by a spring, however the hydraulic cylinder 64 has the benefit of not only providing the required downward bias force, but also can be used to provide a knife actuator to move the trailing arm up from the illustrated operating position to a raised transport position.

In the apparatus of FIGS. 1-3 the mounting of the frame 15 to the wheels is such that the wheels can move up and down with respect to the frame 15 to raise and lower the frame with respect to the ground and thus move the fertilizer knives 32 and seed knives 58 from a transport position above the ground surface 5 to a lowered operating position where the fertilizer knives and seed knives engage the ground and create the furrows.

Referring to FIG. 1, in operation the fertilizer placement openers 20 and seed placement openers 50 move along the ground surface 5 in direction P. As the fertilizer placement opener 20 moves in the direction P, fertilizer knife 32 is biased by the knife biasing device 36 against the ground surface 5, so that the bottom of the fertilizer knife 32 penetrates the ground surface 5 to a depth D1 creating a fertilizer furrow in the ground surface 5.

The knife biasing device 36 exerts a downward force sufficient to maintain the knife in an operating position at a maximum downward position during normal operations, thereby maintaining the fertilizer knife 32 at a substantially constant vertical position with respect to the frame 15, such that as the frame moves across a field, the depth of the fertilizer furrow D1 is maintained more less consistent, as the frame 15 will move up and down on the wheels of the implement following the ground, as is well known in the art. When the fertilizer knife 32 contacts an obstruction, such as a rock or the like, the knife will move upward against the bias force of the knife biasing element 36 to clear the obstruction, and then move to the maximum down position again. Fertilizer is provided to the fertilizer feed 38 and is deposited into the fertilizer furrow created by the fertilizer knife 32.

As the seed opener 50 moves along the ground surface 5 in direction P, the packer wheel 72 is pushed against the ground and the seed dispensing knife 58 penetrates the ground surface 5 to a depth D2 below the packer wheel 72 creating a furrow in the ground surface 5. Seed is provided to the seed dispensing knife 58 utilizing the seed dispensing tube 62 and the seed is deposited into the seed furrow created by the seed dispensing knife 58. Once the seed is deposited in the seed furrow and the seed placement opener 50 continues to move in the direction P, the packer 72 rolls over and packs the seed furrow The depth D1 the fertilizer knife 32 on the fertilizer placement opener 20 penetrates the ground surface 5 can be adjusted by moving the elongate body member 28 in relation to the frame 15 using the height adjustable connection 26. The depth D2 the seed dispensing knife 58 penetrates the ground surface can be adjusted independently from the depth D1, by adjusting the height of the packer wheel 72 in relation to the seed dispensing knife 58 by moving the packer adjustment brace 70 in relation to the packer adjustment bracket 66.

In this manner, the depth D1 of the fertilizer placed in the soil by the fertilizer placement opener 20 can be adjusted independently from the depth D2 the seed is placed in the soil by the seed placement opener 50 and vice versa. Additionally, because the vertical relation between the packer wheel 72 and the seed dispensing knife 58 predominantly determines the depth D2 of the seed furrow created by the seed placement opener 50, variations in the vertical height of the frame 15 in relation to the ground surface 5 as the seed placement opener 50 moves across the ground surface 5 have a significantly reduced effect on the depth D2 of penetration of the seed dispensing knife 58.

Figure 4:
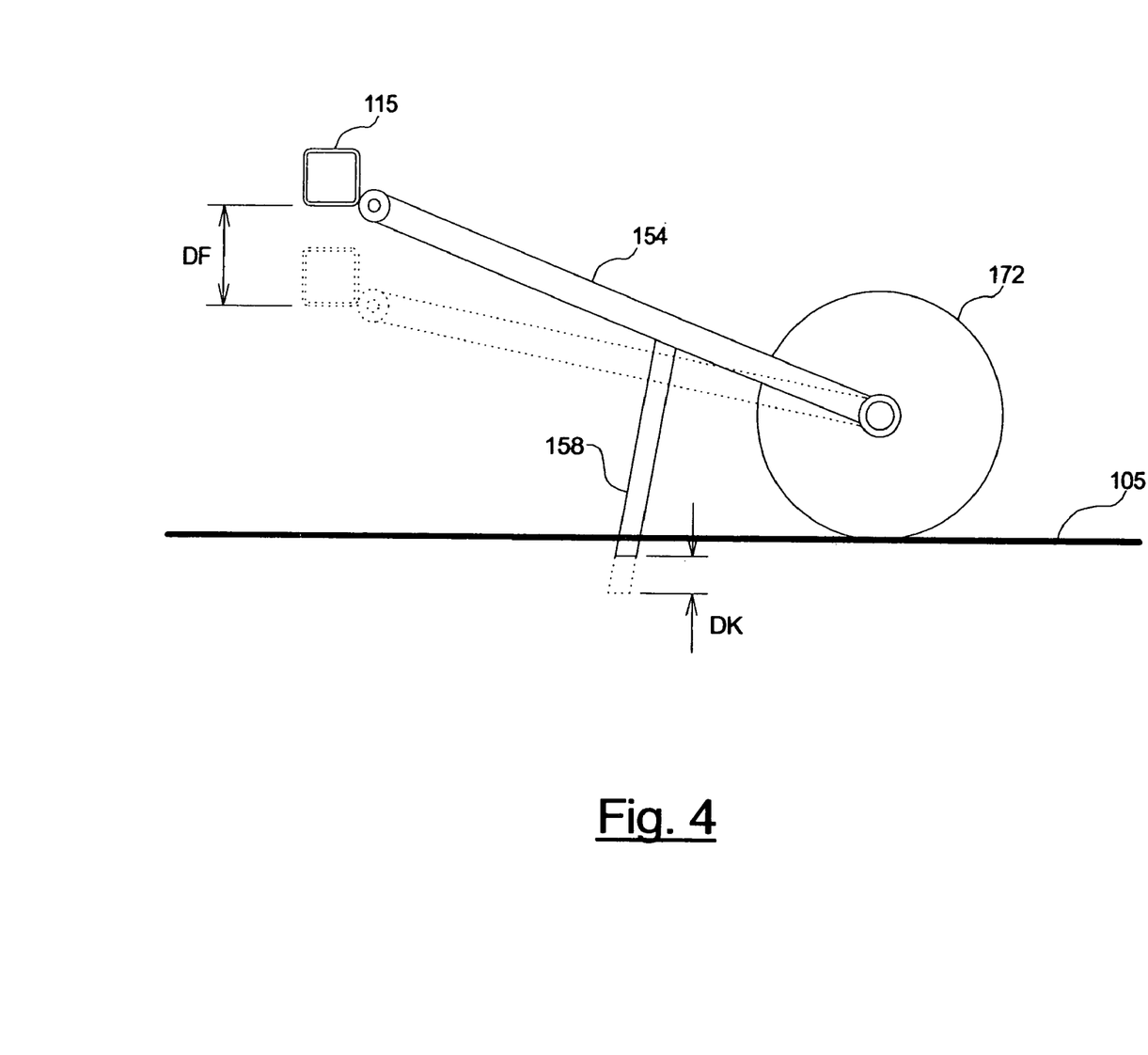
FIG. 4 schematically illustrates the movement of the seed furrow opener with respect to the ground as the frame moves up and down with respect to the ground.

FIG. 4 schematically illustrates how a variation DF in the vertical distance between the frame 115 and the ground surface 105 moves the bottom end of the knife 158 down by a much reduced distance DK. In this manner, the depth D2 of the penetration of the ground surface of the knife 158 is individually controlled by the packer wheel 172 on the end of trailing arm 154 such that variations in the distance between the ground surface 105 and the frame 115 have a much reduced effect on the depth D2 of the seed furrow allowing seeding of uneven ground at a more consistent depth.

It can also be seen from the geometry illustrated in FIG. 4 that a fertilizer knife fixed to the frame 115 will move up and down a significant distance, causing the fertilizer furrow created thereby to have a significant change in depth, with little effect on the depth of the seed furrow. Thus in addition to adjusting fertilizer furrow depth, as described above with respect to the embodiment of FIG. 1, by moving the elongate body member 28 in relation to the frame 15 using the height adjustable connection 26, the depth D1 of the fertilizer furrow can also be varied significantly by moving the frame up and down on the implement wheels, as is known in the art.

FIG. 3 illustrates a perspective view of a section of frame 15 of a planting apparatus comprising front and rear lateral frame members 15F, 15R. Fertilizer assemblies 20 and seed assemblies 50 are attached to the section of frame 15. Seed assemblies 50 are placed at substantially regular intervals along the front and rear frame members 15F, 15R so that the seed furrows created are substantially parallel at approximately regular intervals. The fertilizer assemblies 20 are spaced at regular intervals along the front frame member 15F so that the fertilizer furrows opened by the knives 32 of the fertilizer assemblies 20 are positioned substantially mid-way between adjacent pairs of seed furrows created by the seed assemblies 50.

Thus the knives 32 of the fertilizer assemblies 20 are mounted on the front frame member 15F and engage the ground along a front line substantially perpendicular to the operating travel direction and about directly under the front frame member 15F, while the first set of seed assemblies 50F are also mounted on the front frame member 15F and engage the ground along a middle line rearward of the front frame member 15F and the fertilizer knives 32, generally under the rear frame member 15R, and the seed assemblies 50R mounted on the rear frame member 15R engage the ground along a rear line rearward of the rear frame member 15R. In implement design it is desirable to provide sufficient room around each ground engaging tool, such as the fertilizer knives 32 and seed knives 58, such that the operation of one tool does not interfere with the operation of adjacent tools. Thus ground engaging tools are generally mounted on parallel lateral frame members spaced from front to back along the path of the implement, such that the ground engaging tools mounted on each lateral frame member are spaced a sufficient distance apart both forward and rearward and from side to side.

Because the fertilizer and seed knives 32, 58 are under the ground surface, crop residue and trash laying on the ground surface is raised and shunted to each side of the knives, and the fore and aft and lateral separation allows this trash to wiggle through the furrow openers, as is known in the art. Where the separation either laterally or fore and aft is not sufficient, the furrow openers act like a rake and gather the trash, plugging the seeder.

Where all ground engaging tools are mounted to an implement frame using the same mounting assembly, as is commonly the case, in order to provide three ranks of tools working along three parallel rows spaced from front to back along the path of the implement it is necessary to provide three lateral frame members.

By mounting the fertilizer knives 32 oriented substantially vertically under the frame, and mounting the seed furrow openers, knives 58 on trailing arms 54 extending rearward, the ground engaging tools can be mounted on only two lateral frame members. A desired spacing between the front, middle and rear lines of ground engagement can be configured readily by adjusting the length of the trailing arms 54, or like modifications.

The illustrated apparatus of FIGS. 1-3 provides a fertilizer furrow between adjacent pairs of seed furrows, such that there are two seed assemblies for each fertilizer assembly. Alternatively a fertilizer assembly could be provided for each seed assembly such that the fertilizer and seed furrows alternate across the width of the implement. The apparatus can be configured such that the fertilizer furrows are mid-way between the seed furrows such that seed in each seed furrow draws fertilizer from both sides, or alternatively could be shifted laterally so that the fertilizer furrows are still between seed furrows, but are closer to one seed furrow such that seed in each seed furrow predominantly draws fertilizer from the fertilizer in the closest fertilizer furrow.

FIGS. 5-11 illustrate an alternate embodiment of the seeding and fertilizing apparatus of the invention. The apparatus comprises an implement frame 215 mounted on wheels for travel over the ground in an operating travel direction P. A plurality of seed assemblies 250 are attached to the implement frame 215. The seed assemblies 250 comprise a trailing arm 254 pivotally connected at a front end thereof to the frame 215 about substantially horizontal and parallel front arm axes AA and AA' oriented substantially perpendicular to the operating travel direction P. A seed furrow opener, again illustrated as a seed knife 258, is attached to the trailing arm 254 and is operative to create a seed furrow when a bottom end thereof is engaged in the ground. A packer wheel 272 is rotatably attached rearward of the seed knife 258 and is oriented to roll substantially along the seed furrow.

Figure 7:
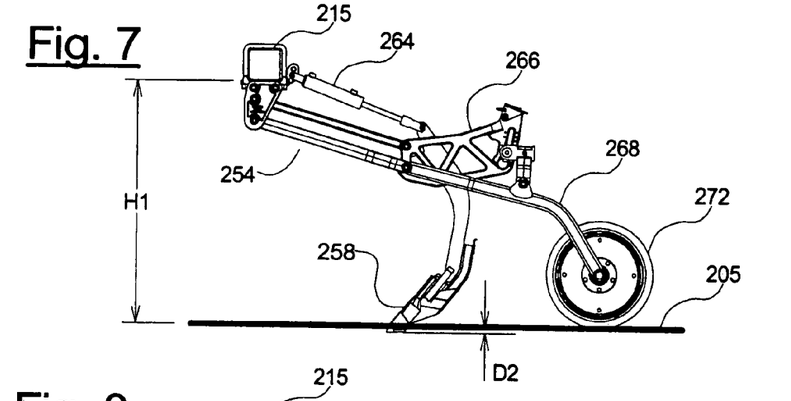
FIGS. 7-9 are schematic side views showing the how the seed furrow depth remains substantially constant as the parallel link trailing arm moves up and down.
Figure 8:
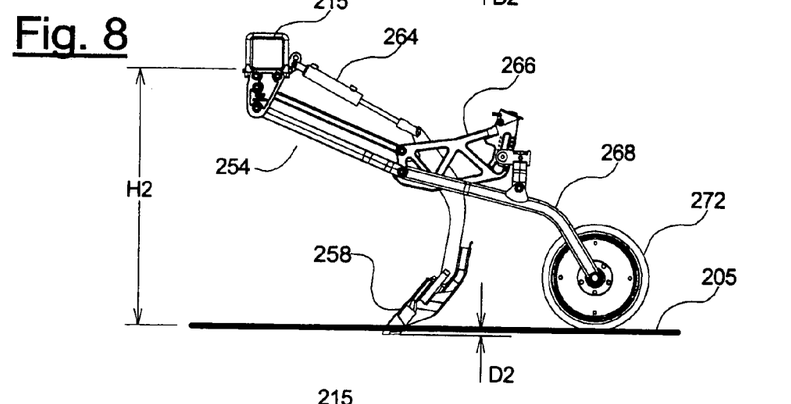
Figure 9:
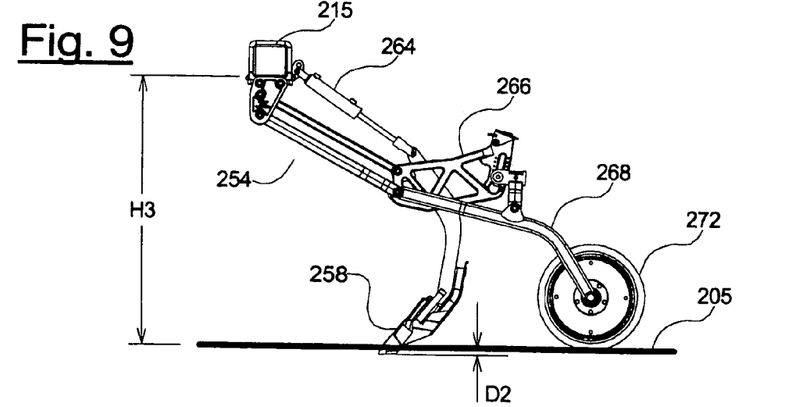

The illustrated trailing arm 254 comprises a parallel linkage 202 operative to maintain the knife 258 and packer wheel 272 at substantially constant vertical positions with respect to each other as the trailing arm moves up and down, as illustrated in FIGS. 7-9. As can be seen, the depth D2 of the seed furrow is substantially constant as the frame 215 moves up from a height H1 above the ground 205 as illustrated in FIG. 7, to the increased height H2 of FIG. 8 and to the further increased height H3 of FIG. 9. As the frame 215 moves up relative to the ground 205, the trailing arm 254 moves down relative to the frame 215, and vice versa. In field conditions this will occur due to humps and valleys in the ground surface. In contrast to the single arm 154 pivotally attached to the frame 115 in FIG. 4, the parallel linkage 202 greatly improves the consistency of the seed furrow depth D2.

By maintaining the knife 258 and packer wheel 272 at substantially constant vertical positions with respect to each other as the trailing arm 254 moves up and down following ground contours, it is possible to move the knife 258 farther forward and away from the packer wheel 272, compared to the apparatus illustrated in FIG. 4, while still maintaining consistent seed furrow depth D2. It can be seen that moving the knife 158 of FIG. 4 forward away from the packer wheel 172 will increase the already significant variations in seed furrow depth as the frame 115 moves through the height difference DF with respect to the ground surface 105.

In operation, it is desirable to allow soil moved aside by the knife 258 to fall back into the seed furrow created by the knife 258 before the packer wheel rolls over the furrow. In the apparatus of FIG. 4, where the knife 158 is very close to the packer wheel 172, operating speeds are limited because of the short distance between the knife 158 and packer wheel 172. The speed must be reduced to allow time for the soil to fall back into the seed furrow. Moving the knife 258 forward to increase the distance between the knife 258 and the packer wheel 272 allows the soil moved aside by the knife 258 more time to fall back into the seed furrow before the packer wheel 272 passes over the furrow. Operating speeds can therefore be increased compared to the apparatus of FIG. 4.

Figure 5:
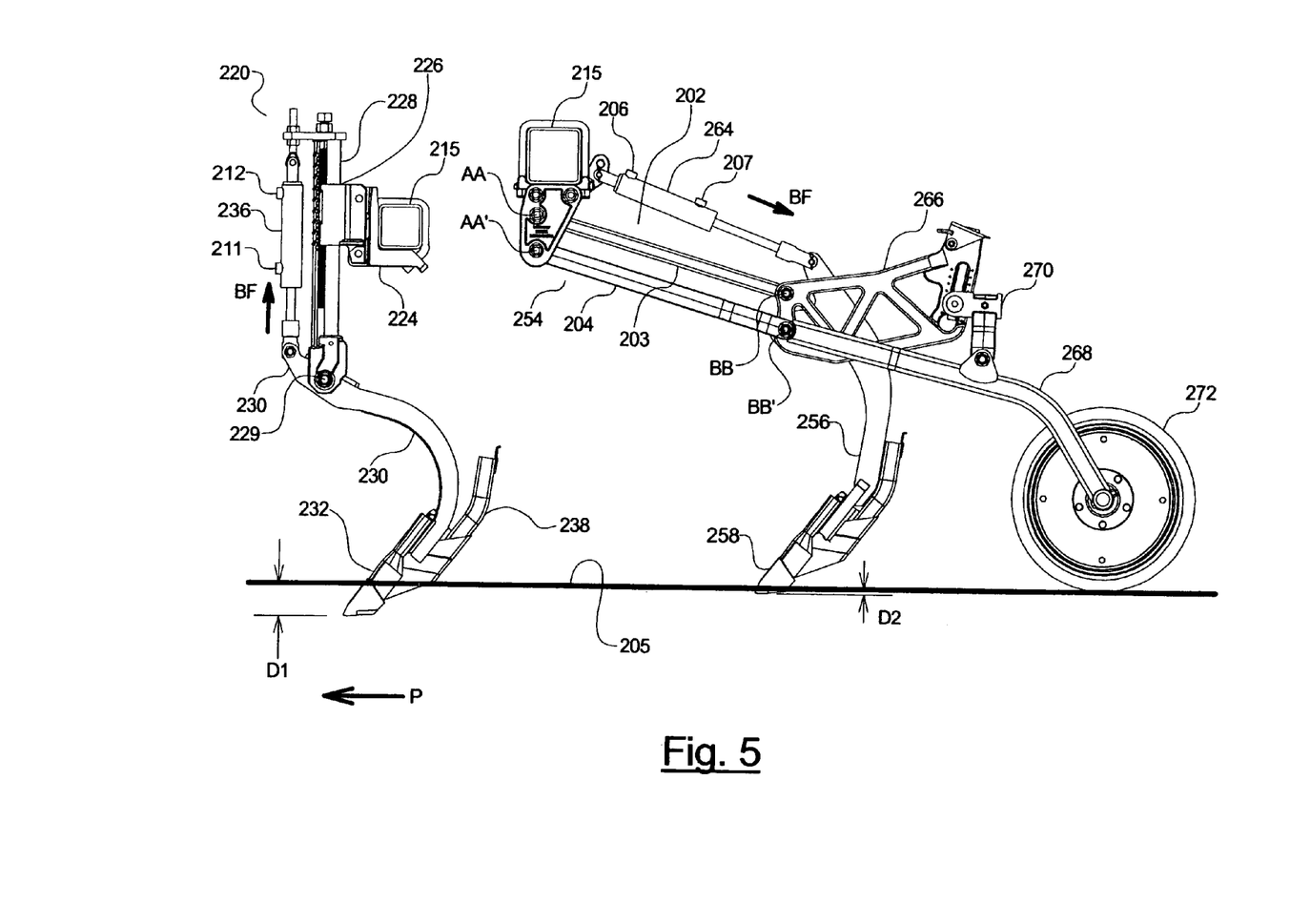
FIG. 5 is a schematic side view of an alternate embodiment of the invention showing fertilizer and seed assemblies mounted to a frame, and shown in the operating position.

The parallel linkage 202 comprises upper and lower links 203, 204, each pivotally attached at forward ends thereof about axes AA and AA' respectively. Rear ends of the links 203, 204 are pivotally attached to the forward ends of a packer bracket 266 about axes BB and BB' respectively. The axes AA, AA', BB, and BB' are oriented such that the upper and lower links 203, 204 are parallel as they move up and down.

Packer wheel arm 268 is pivotally attached at a front end thereof to the packer bracket 266 about axis BB', and packer wheel 272 is rotatably attached to the rear end of the packer wheel arm 268. Seed shank 256 is pivotally attached at a mid portion thereof to the packer bracket 266 and knife 258 is attached to a bottom end of the seed shank 256. During field operations, a first port 206 of the hydraulic cylinder 264 is connected to an active hydraulic source, as described above with respect to the embodiment of FIGS. 1-3, such that the hydraulic cylinder 264 acts as a trailing arm actuator and exerts a substantially constant bias force BF on the top end of the seed shank 256, causing same to pivot about the axis BB' and bear against a stop on the packer bracket 266 such that the bias force is transferred to the packer bracket 266 and parallel linkage 202 which are pushed downward to engage the bottom end of the knife 258 in the ground and create the seed furrow.

A packer adjustment brace 270 is attached to the packer wheel arm 268 and engages a slot in the packer bracket 266. The brace 270 is moved along the slot to set the vertical position of the seed knife 258 with respect to the packer wheel 272 at the required location to provide a desired depth D2 of the seed furrow, and then the brace 270 is locked to the packer bracket 266. The bias force BF pushes the packer wheel 272 against the ground 205.

Figure 6:
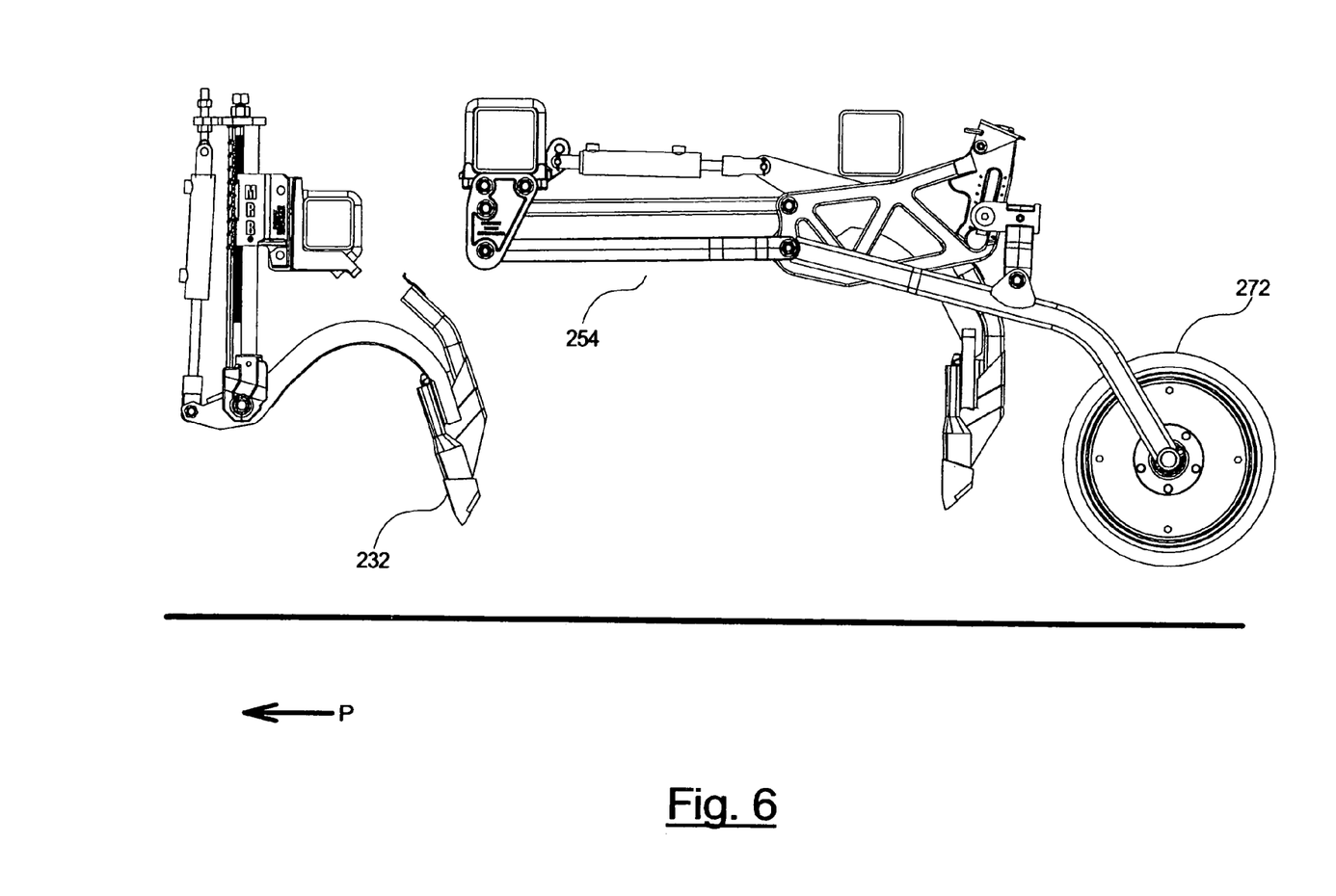
FIG. 6 is a schematic side view of the embodiment of FIG. 5 showing fertilizer and seed assemblies in the transport position.

To move the knife 258 up and out of engagement with the ground, again as described above, the active hydraulic source is connected to a second port 207 on the hydraulic cylinder 264 to retract the hydraulic cylinder 264 and pivot the top end of the seed shank 256 toward the hydraulic cylinder 264 and cause a recess in the seed shank 256 to bear against a pin providing the axis BB at which point further retraction of the hydraulic cylinder 264 raises the parallel linkage 202 of the trailing arm 254, and the packer wheel arm 268 to the transport position illustrated in FIG. 6.

The apparatus of FIGS. 5-11 also comprises a plurality of fertilizer assemblies 220. In the illustrated embodiment each fertilizer assembly 220 comprises a mounting bracket 224 attached to the frame 215. The mounting bracket 224 is connected to an elongate member 228 through a height adjustable connection 226. By using the height adjustable connection 226, the distance between the bottom of the fertilizer knife 232 and the frame 215 can be varied to set the depth D1 of the fertilizer furrow.

A fertilizer knife shank 230 is pivotally connected to the lower end of the elongate member 228 with a shank pin 229, and a fertilizer knife 232 is attached to the fertilizer knife shank 230 and is biased downward by a hydraulic cylinder 236.

The hydraulic cylinder 236 is connected to an active hydraulic source at a first port 211 thereof and exerts a downward force on the fertilizer knife 232 by exerting an upward bias force BF on the front end of the knife shank 230 forward of the shank pin 229. The bias force BF is sufficient to maintain the fertilizer knife 232 at an operating position at the maximum downward position during normal operations, thereby maintaining the fertilizer knife 232 at a substantially constant vertical position with respect to the frame 215, such that as the frame 215 moves across a field, the depth of the fertilizer furrow D1 is maintained more less consistent, as the frame 215 will move up and down on the wheels of the implement following the ground, as is well known in the art. When the fertilizer knife 232 contacts an obstruction, such as a rock or the like, the knife will trip and move upward against the bias force of the hydraulic cylinder 236 to clear the obstruction, and then move to the operating position again. Fertilizer is provided to the fertilizer feed 238 as described above and is deposited into the fertilizer furrow created by the fertilizer knife 232.

The apparatus of FIGS. 5-11 has a frame 215 that is fixed in vertical relationship to the wheels carrying the frame. Thus the seed knives 258 and packer wheels 272 are raised from the operating position shown in FIG. 5 to the transport position shown in FIG. 6 by the hydraulic cylinder 264, while the frame stays at a constant vertical position with respect to the ground. Similarly, the active hydraulic source is connected to a second port 212 on the hydraulic cylinder 236 to extend the hydraulic cylinder 236 and move the fertilizer knives 232 upward to the raised transport position of FIG. 6.

Figure 10:
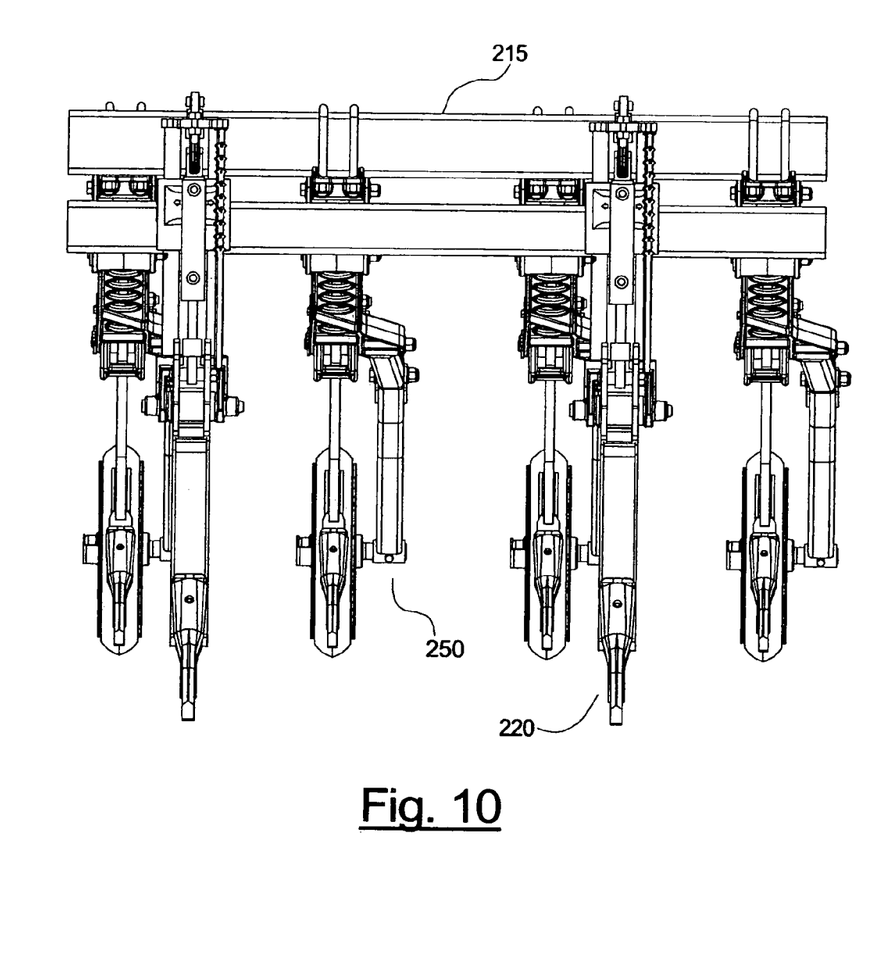
FIG. 10 is a front view of a plurality of seed and fertilizer assemblies of FIG. 5 mounted on the frame.

As illustrated in FIG. 10, the seed assemblies 250 and fertilizer assemblies 220 are oriented laterally on the implement frame 215 such that in operation each fertilizer furrow is located between adjacent pairs of seed furrows.

Figure 11:
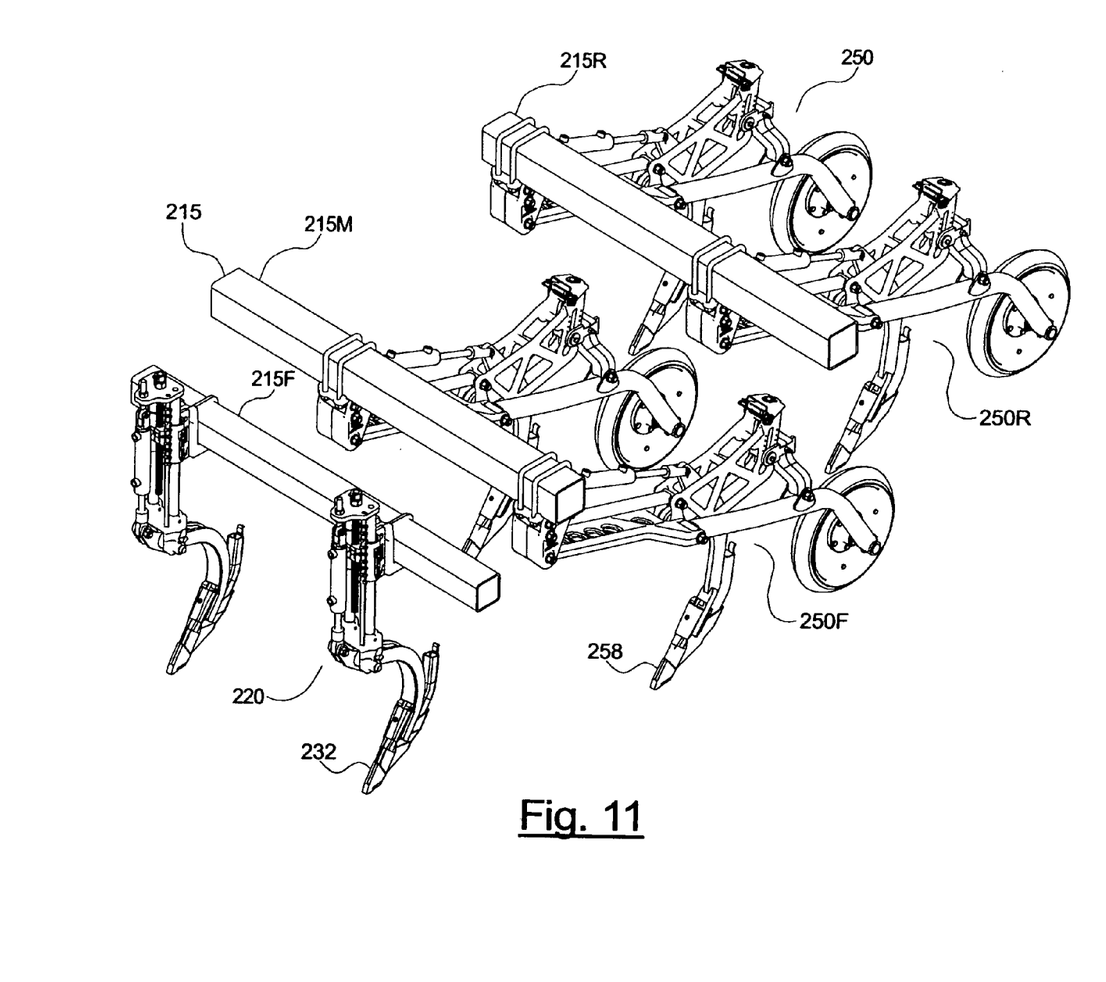
FIG. 11 is perspective view of the seed and fertilizer assemblies and frame of FIG. 10.

FIG. 11 illustrates a perspective view of a section of frame 215 of a planting apparatus comprising front, middle, and rear lateral frame members 215F, 215M, and 215R. Fertilizer assemblies 220 and seed assemblies 250 are attached to the section of frame 215. Seed assemblies 250 are placed at substantially regular intervals along the middle and rear frame members 215M, 215R so that the seed furrows created are substantially parallel at approximately regular intervals. The fertilizer assemblies 220 are spaced at regular intervals along the front frame member 215F so that the fertilizer furrows opened by the knives 232 of the fertilizer assemblies 220 are positioned substantially mid-way between adjacent pairs of seed furrows created by the seed assemblies 250.

Thus the knives 232 of the fertilizer assemblies 220 are mounted on the front frame member 215F and engage the ground along a front line substantially perpendicular to the operating travel direction and about directly under the front frame member 215F, while the first set of seed assemblies 250F are mounted on the middle frame member 215M and engage the ground along a middle line rearward of the front frame member 215F and the knives 232, generally under the rear frame member 215R, and the seed assemblies 250R mounted on the rear frame member 215R engage the ground along a rear line rearward of the rear frame member 215R. Ample spacing is thus provided for each ground engaging element, fertilizer knives 232 and seed knives 258.

There is also disclosed a method of single pass placement of seed and fertilizer in an agricultural application using the apparatus outlined herein. The method comprises providing a number of fertilizer placement openers 20, 220 that create a fertilizer furrow in a ground surface using a fertilizer knife 32, 232 and places fertilizer in the fertilizer furrow; adjusting a depth of the fertilizer furrows to a desired depth; providing a number of seed placement openers 50, 250 that create a seed furrow in a ground surface using a seed dispensing knife 58, 258 and placing seed in the seed furrow, the depth of the seed furrow determined by the adjustment of the height of a packer wheel 72, 272 in relation to the seed dispensing knife; attaching the seed placement openers 50, 250 to a frame 15, 215 of a planting apparatus such that the seed placement openers create a series of parallel seed furrows in a ground surface, the seed furrows being spaced apart at substantially regular intervals; attaching fertilizer placement openers 20, 220 to the frame of the planting apparatus such that the fertilizer placement openers create fertilizer furrows between adjacent pairs of seed furrows created by the seed placement openers; and moving the planting apparatus across the ground surface and depositing seed and fertilizer in corresponding seed and fertilizer furrows to seed and fertilize the ground surface.

The fertilizer assemblies of FIG. 5, where the bias element is provided by the hydraulic cylinder 236, can be advantageous when provided on a frame that is fixed vertically with respect to the wheels, or where the frame moves up and down with respect to the wheels. On occasion a seeding operation may not also require the application of fertilizer. On such occasions, the hydraulic cylinder 236 can be operated to move the fertilizer knives 232 with respect to the frame to the raised position wherein the fertilizer knives are above the ground and only the seed furrow openers 258 are engaged in the ground, with fertilizer knives 232 "parked" in the raised position. Thus unnecessary wear on fertilizer assemblies 220, especially the fertilizer knives 232, is avoided.

The foregoing is considered as illustrative only of the principles of the invention. Further, since numerous changes and modifications will readily occur to those skilled in the art, it is not desired to limit the invention to the exact construction and operation shown and described, and accordingly, all such suitable changes or modifications in structure or operation which may be resorted to are intended to fall within the scope of the claimed invention.

What is claimed is:

1. A seeding and fertilizing apparatus comprising:
   an implement frame mounted on wheels for travel over the ground in an operating travel direction;
   a plurality of seed assemblies attached to the implement frame, each seed assembly comprising:
   a trailing arm pivotally connected at a front end thereof to the frame about a substantially horizontal front arm axis oriented substantially perpendicular to the operating travel direction;
   a seed furrow opener attached to the trailing arm and operative to create a seed furrow when a bottom end thereof is engaged in the ground;
   a packer wheel rotatably attached to the trailing arm rearward of the seed furrow opener and oriented to roll substantially along the seed furrow;
   wherein a vertical operating position of the seed furrow opener with respect to the packer wheel is adjustable to vary a depth of the seed furrow; and
   a bias device operative to exert a downward bias force on the trailing arm, seed furrow opener, and packer wheel;
   a plurality of fertilizer assemblies each comprising a fertilizer knife mounted to the fertilizer assembly and operative to create a fertilizer furrow when engaged in the ground;
   wherein the fertilizer knives and seed furrow openers are movable from a transport position above the ground to a lowered operating position wherein the fertilizer knives and seed furrow openers are engaged in the ground;
   wherein the seed assemblies and fertilizer assemblies are oriented laterally on the implement frame such that in operation each fertilizer furrow is located between adjacent seed furrows.

2. The apparatus of claim 1 wherein a vertical operating position of the fertilizer knife with respect to the implement frame is adjustable.

3. The apparatus of claim 1 wherein the seed assemblies and fertilizer assemblies are oriented laterally such that each fertilizer furrow is located substantially mid-way between adjacent pairs of seed furrows.

4. The apparatus of claim 1 wherein the frame comprises front and rear lateral frame members, and wherein:
   the fertilizer assemblies are mounted to the front frame member such that same engage the ground along a front line substantially perpendicular to the operating travel direction and substantially under the front frame member;
   a first set of seed assemblies each has a trailing arm pivotally connected at a front end thereof to the front frame member such that a first set of seed furrow openers operates along a middle line substantially perpendicular to the operating travel direction and a desired distance rearward of the front line; and
   a second set of seed assemblies each has a trailing arm pivotally connected at a front end thereof to the rear frame member such that a second set of seed furrow openers operates along a rear line substantially perpendicular to the operating travel direction and a desired distance rearward of the middle line.

5. The apparatus of claim 1 wherein the frame comprises front, middle and rear lateral frame members, and wherein:
   the fertilizer assemblies are mounted to the front frame member such that same engage the ground along a front line substantially perpendicular to the operating travel direction and substantially under the front frame member;
   a first set of seed assemblies each has a trailing arm pivotally connected at a front end thereof to the middle frame member such that a first set of seed furrow openers operates along a middle line substantially perpendicular to the operating travel direction and a desired distance rearward of the front line; and
   a second set of seed assemblies each has a trailing arm pivotally connected at a front end thereof to the rear frame member such that a second set of seed furrow openers operates along a rear line substantially perpendicular to the operating travel direction and a desired distance rearward of the middle line.

6. The apparatus of claim 1 wherein the frame is mounted to the wheels such that a vertical position of the frame with respect to the wheels can be varied to move the fertilizer knives and seed furrow openers from the transport position down into the operating position.

7. The apparatus of claim 6 wherein at least one fertilizer knife is mounted on a bottom end of a fertilizer shank that is vertically adjustable with respect to the frame.

8. The apparatus of claim 6 comprising a fertilizer knife actuator operative to move the fertilizer knife of at least one fertilizer assembly with respect to the frame from a raised position to a lowered position.

9. The apparatus of claim 8 wherein the at least one fertilizer assembly comprises a fertilizer shank pivotally attached at a first end thereof to the frame, and wherein the fertilizer knife is attached to a lower end of the fertilizer shank, and wherein the fertilizer knife actuator is operative to move the fertilizer shank and attached fertilizer knife from the raised position to the lowered position.

10. The apparatus of claim 1 wherein:
    the frame is mounted to the wheels such that a vertical position of the frame with respect to the wheels is substantially fixed when in a field working position;
    at least one fertilizer assembly comprises a fertilizer knife actuator operative to move the fertilizer knife of the at least one fertilizer assembly with respect to the frame from the transport position to the operating position; and
at least one seed assembly comprises a trailing arm actuator operative to move the trailing arm from a transport position downward to the operating position.

11. The apparatus of claim 10 wherein the at least one fertilizer assembly comprises a fertilizer shank pivotally attached at a first end thereof to the frame, and wherein the fertilizer knife is attached to a lower end of the fertilizer shank, and wherein the fertilizer knife actuator is operative to move the fertilizer shank and attached fertilizer knife from the transport position to the operating position.

12. The apparatus of claim 10 wherein the seed furrow opener is pivotally attached to the trailing arm by a seed shank, and wherein the trailing arm actuator is attached to the seed shank.

13. The apparatus of claim 10 wherein at least one bias device comprises a hydraulic cylinder.

14. The apparatus of claim 13 wherein the hydraulic cylinder is connectable to an active hydraulic source operative, when connected to a first port of the hydraulic cylinder, to maintain a substantially constant pressure in the hydraulic cylinder to exert a substantially constant downward bias force on the trailing arm when the trailing arm is in the operating position while allowing the hydraulic cylinder to extend and retract in response to forces exerted on the trailing arm, and operative, when connected to a second port of the hydraulic cylinder, to raise the trailing arm to a transport position.

15. The apparatus of claim 1 wherein at least one trailing arm comprises a parallel linkage operative to maintain the knife and packer wheel at substantially constant vertical positions with respect to each other as the trailing arm moves up and down.

16. A method of seeding and fertilizing a field comprising:
providing an implement frame mounted on wheels for travel over the ground in an operating travel direction;
attaching a plurality of seed assemblies to the implement frame, each seed assembly comprising:
a trailing arm pivotally connected at a front end thereof to the frame about a substantially horizontal front arm axis oriented substantially perpendicular to the operating travel direction;
a packer wheel rotatably attached to a rear end of the trailing arm;
a seed furrow opener attached to the trailing arm ahead of the packer wheel and operative to create a seed furrow when a bottom end thereof is engaged in the ground, the seed furrow opener oriented such that the packer wheel rolls substantially along the seed furrow; and
a bias device operative to exert a downward bias force on the trailing arm when the trailing arm is in the operating position;
adjusting a vertical position of the seed furrow opener to a desired position with respect to the packer wheel;
mounting a plurality of fertilizer assemblies to the frame, each fertilizer assembly comprising a fertilizer knife operative to create a fertilizer furrow when engaged in the ground;
orienting the seed assemblies and fertilizer assemblies laterally on the implement frame such that in operation each fertilizer furrow is located between adjacent seed furrows;
moving the seed furrow openers and fertilizer knives down from a transport position above the ground to a lowered operating position wherein the fertilizer knives and seed furrow openers are engaged in the ground;
moving the implement frame across the field in the operating travel direction and depositing fertilizer into the fertilizer furrows and depositing seed into the seed furrows ahead of the packer wheel.

17. The method of claim 16 comprising orienting the seed assemblies and fertilizer assemblies laterally such that each fertilizer furrow is located substantially mid-way between adjacent pairs of seed furrows.

18. The method of claim 16 wherein the frame comprises front and rear lateral frame members, and wherein:
the fertilizer knives are mounted to the front frame member such that same engage the ground along a front line substantially perpendicular to the operating travel direction and substantially under the front frame member;
a first set of seed assemblies each has a trailing arm pivotally connected at a front end thereof to the front frame member such that a first set of seed furrow openers operates along a middle line substantially perpendicular to the operating travel direction and a desired distance rearward of the front line; and
a second set of seed assemblies each has a trailing arm pivotally connected at a front end thereof to the rear frame member such that a second set of seed furrow openers operates along a rear line substantially perpendicular to the operating travel direction and a desired distance rearward of the middle line.

19. The method of claim 16 wherein the frame comprises front, middle and rear lateral frame members, and wherein:
the fertilizer knives are mounted to the front frame member such that same engage the ground along a front line substantially perpendicular to the operating travel direction and substantially under the front frame member;
a first set of seed assemblies each has a trailing arm pivotally connected at a front end thereof to the middle frame member such that a first set of seed furrow openers operates along a middle line substantially perpendicular to the operating travel direction and a desired distance rearward of the front line; and
a second set of seed assemblies each has a trailing arm pivotally connected at a front end thereof to the rear frame member such that a second set of seed furrow openers operates along a rear line substantially perpendicular to the operating travel direction and a desired distance rearward of the middle line.

20. The method of claim 16 wherein the frame is mounted to the wheels such that a vertical position of the frame with respect to the wheels can be varied to move the fertilizer knives from the transport position down into the operating position.

21. The method of claim 20 wherein the frame is mounted to the wheels such that a vertical position of the frame with respect to the wheels can be varied to move the seed furrow openers from the transport position down into the operating position.

22. The method of claim 20 wherein at least one fertilizer knife is mounted on a bottom end of a fertilizer shank that is vertically adjustable with respect to the front frame member.

23. The method of claim 20 comprising providing fertilizer knife actuators operative to move the fertilizer knives with respect to the frame from a raised position to a lowered position, and comprising moving the fertilizer knives to the raised position wherein the fertilizer knives are above the ground and the seed furrow openers are engaged in the ground and moving the implement frame across the field in the operating travel direction and depositing seed into the seed furrows ahead of the packer wheel.

24. The method of claim 16 wherein the frame is mounted to the wheels such that a vertical position of the frame with respect to the wheels is substantially fixed when in a field working position and wherein at least one fertilizer assembly comprises a fertilizer knife actuator operative to move the fertilizer knife of the at least one fertilizer assembly with respect to the frame from the transport position to the operating position.

25. The method of claim 24 wherein the at least one fertilizer assembly comprises a fertilizer shank pivotally attached at a first end thereof to the frame, and wherein the fertilizer knife is attached to a lower end of the fertilizer shank, and wherein the fertilizer knife actuator is operative to move the fertilizer shank and attached fertilizer knife from the transport position to the operating position.

26. The method of claim 24 wherein the seed furrow opener is pivotally attached to the trailing arm by a seed shank, and wherein the trailing arm actuator is attached to the seed shank.

27. The method of claim 24 wherein at least one bias device comprises a hydraulic cylinder.

28. The method of claim 27 wherein the hydraulic cylinder is connectable to an active hydraulic source operative, when connected to a first port of the hydraulic cylinder, to maintain a substantially constant pressure in the hydraulic cylinder to exert a substantially constant downward bias force on the trailing arm when the trailing arm is in the operating position while allowing the hydraulic cylinder to extend and retract in response to forces exerted on the trailing arm, and operative, when connected to a second port of the hydraulic cylinder, to raise the trailing arm to a transport position.

29. The method of claim 16 wherein at least one trailing arm comprises a parallel linkage operative to maintain the knife and packer wheel at substantially constant vertical positions with respect to each other as the trailing arm moves up and down.

* * * * *